United States Patent
Han et al.

(10) Patent No.: US 10,757,185 B2
(45) Date of Patent: Aug. 25, 2020

(54) METHOD FOR PEER-TO-PEER MULTIMEDIA DATA SHARING, ELECTRONIC DEVICE AND NON-VOLATILE COMPUTER READABLE MEDIUM

(71) Applicant: Wistron Corporation, New Taipei (TW)

(72) Inventors: Yen-Kang Han, New Taipei (TW); Po-Hsu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 325 days.

(21) Appl. No.: 14/848,313

(22) Filed: Sep. 8, 2015

(65) Prior Publication Data

US 2016/0119415 A1  Apr. 28, 2016

(30) Foreign Application Priority Data

Oct. 24, 2014  (TW) .............................. 103136810 A (51) Int. Cl.
  *G06F 15/16*  (2006.01)
  *H04L 29/08*  (2006.01)
  (Continued)

(52) U.S. Cl.
  CPC ...... *H04L 67/1068* (2013.01); *H04L 65/1069* (2013.01); *H04L 65/4069* (2013.01);
  (Continued)

(58) Field of Classification Search
  CPC . H04L 12/2812; H04L 63/08; H04L 12/2809; H04L 63/083; H04L 63/062;
  (Continued)

(56) References Cited

U.S. PATENT DOCUMENTS 8,340,007 B2  12/2012  Lu et al.
8,378,807 B2 *  2/2013  Lee .................... H04M 1/6066
                                                     340/505

(Continued)

FOREIGN PATENT DOCUMENTS

| CN | 101640581 | 2/2010 |
|---|---|---|
| WO | 2012078079 | 6/2012 |
| WO | 2013173848 | 11/2013 |

OTHER PUBLICATIONS

"Office Action of Taiwan Counterpart Application with partial English translation", dated Jan. 12, 2016, p. 1-p. 14, in which the listed reference was cited.

(Continued)

*Primary Examiner* — Dustin Nguyen
(74) *Attorney, Agent, or Firm* — JCIPRNET (57) ABSTRACT

A method for peer-to-peer multimedia data sharing suitable for an electronic device is provided. The method includes the following step: scanning at least one sink device having Peer-to-Peer connectivity; determining a candidate device from the at least one sink device according a distance between the electronic device and the at least one sink device; deriving a beacon from the candidate device; establishing a Peer-to-Peer connection with the candidate device according to the beacon; and transmitting multimedia data to the candidate device.

14 Claims, 5 Drawing Sheets

(51) Int. Cl.
  *H04W 4/80* (2018.01)
  *H04W 76/14* (2018.01)
  *H04L 29/06* (2006.01)
(52) U.S. Cl.
  CPC .......... *H04L 67/141* (2013.01); *H04L 67/148* (2013.01); *H04W 4/80* (2018.02); *H04W 76/14* (2018.02)
(58) Field of Classification Search
  CPC ........ H04L 67/12; H04L 29/06; H04W 4/008; H04W 12/06; H04W 8/005; H04W 48/18; H04W 76/14; H04W 88/06; H04W 4/08; H04W 4/80; G01S 5/14; G06F 21/6245; H04M 1/7253; H04M 1/6066; H04N 1/00347; G06Q 50/22
  See application file for complete search history.

(56) References Cited

U.S. PATENT DOCUMENTS

| | | | | |
|---|---|---|---|---|
| 8,391,787 | B2* | 3/2013 | Kim | H04M 1/7253 455/41.1 |
| 8,391,868 | B2 | 3/2013 | Han et al. | |
| 8,588,693 | B2* | 11/2013 | Lazaridis | H04L 67/34 455/41.3 |
| 8,775,533 | B2* | 7/2014 | Hassan | H04W 12/06 709/206 |
| 8,879,994 | B2* | 11/2014 | Brown | H04N 1/00347 455/41.3 |
| 9,282,423 | B2* | 3/2016 | Luna | H04L 67/12 |
| 9,510,201 | B1* | 11/2016 | Shimoon | H04W 76/14 |
| 10,044,692 | B2* | 8/2018 | Kunihiro | H04W 12/06 |
| 2003/0064718 | A1 | 4/2003 | Haines et al. | |
| 2007/0297426 | A1* | 12/2007 | Haveson | H04L 12/2812 370/401 |
| 2010/0029205 | A1 | 2/2010 | Lu et al. | |
| 2010/0164685 | A1 | 7/2010 | Pering et al. | |
| 2010/0164693 | A1* | 7/2010 | Zhang | H04L 12/2809 340/10.31 |
| 2010/0169399 | A1* | 7/2010 | Moroney | H04L 63/083 708/250 |
| 2010/0262696 | A1* | 10/2010 | Oshiba | H04M 1/7253 709/227 |
| 2012/0011247 | A1* | 1/2012 | Mallik | H04W 8/005 709/224 |
| 2012/0052829 | A1* | 3/2012 | Lee | H04W 48/18 455/226.2 |
| 2013/0170482 | A1* | 7/2013 | Jung | H04W 8/005 370/338 |
| 2014/0030982 | A1* | 1/2014 | Cardona | G01S 5/14 455/67.11 |
| 2014/0194062 | A1* | 7/2014 | Palin | H04W 4/008 455/41.2 |
| 2015/0082382 | A1* | 3/2015 | Maguire | H04L 63/08 726/3 |
| 2015/0126188 | A1* | 5/2015 | Lindoff | H04W 8/005 455/434 |
| 2015/0201372 | A1* | 7/2015 | Chu | H04W 88/06 370/254 |
| 2015/0230280 | A1* | 8/2015 | Dees | H04L 63/062 455/39 |
| 2015/0304342 | A1* | 10/2015 | Cheng | G06F 21/6245 726/7 |

OTHER PUBLICATIONS

"Office Action of China Counterpart Application", dated Oct. 25, 2018, p. 1-p. 8.

* cited by examiner

METHOD FOR PEER-TO-PEER MULTIMEDIA DATA SHARING, ELECTRONIC DEVICE AND NON-VOLATILE COMPUTER READABLE MEDIUM

CROSS-REFERENCE TO RELATED APPLICATION

This application claims the priority benefit of Taiwan application serial no. 103136810, filed on Oct. 24, 2014. The entirety of the above-mentioned patent application is hereby incorporated by reference herein and made a part of this specification.

BACKGROUND

Technical Field

The disclosure relates to an electronic device, and particularly relates to an electronic device, a method for peer-to-peer multimedia data sharing and a non-volatile computer readable medium thereof.

Related Art

In recent years, along with booming development of wireless communication techniques, the wireless communication techniques are widely applied to various electronic products. For example, multimedia data such as images and music, etc. in a handheld electronic device is shared to other relatively large display devices or video equipment by using the wireless communication technique such as WiFi or bluetooth, etc., such that a user can arbitrarily use various playing devices to enjoy or share the multimedia data stored in the mobile electronic device.

Regarding desktop (i.e. a user interface or an application interface corresponding to an operating system of the mobile electronic device) sharing, although related techniques have been developed, during a process of setting the desktop sharing, the user has to perform complicated settings, for example, searching a sink device, selecting the sink device, inputting a pin code, selecting output multimedia data, etc. in order to transmit the multimedia data to the sink device. Moreover, various manufacturers provide different interfaces for user's operation and setting, which may cause a certain degree of inconvenience and difficulty in utilization for user.

SUMMARY

The disclosure is directed to a method for peer-to-peer multimedia data sharing, an electronic device and a non-volatile computer readable medium, by which a user is capable of sharing a user interface and multimedia data in the electronic device in a simple manner.

The disclosure provides a method for peer-to-peer multimedia data sharing, which is adapted to an electronic device, and includes the following step. First, at least one first sink device having peer-to-peer connectivity is scanned. Then, one of the at least one first sink device is determined to serve as a candidate device according a distance between the electronic device and each of the at least one first sink device. Then, a beacon is derived from the candidate device. A peer-to-peer connection is established with the candidate device according to the beacon. Multimedia data is transmitted to the candidate device.

The disclosure provides an electronic device including a communication unit and a processing unit coupled to the communication unit. The processing unit scans at least one first sink device having peer-to-peer connectivity through the communication unit. The processing unit determines one of the at least one first sink device to serve as a candidate device according a distance between the electronic device and each of the at least one first sink device. The processing unit derives a beacon from the candidate device through the communication unit. The processing unit establishes a peer-to-peer connection with the candidate device according to the beacon. The processing unit transmit multimedia data to the candidate device through the communication unit.

The disclosure provides a non-volatile computer readable medium, which is adapted to store a plurality of program codes, where the program codes are adapted to be loaded to a processing unit to execute following steps. At least one first sink device having peer-to-peer connectivity is scanned. One of the at least one first sink device is determined to serve as a candidate device according a distance between the electronic device and each of the at least one first sink device. A beacon is derived from the candidate device. A peer-to-peer connection is established with the candidate device according to the beacon. Multimedia data is transmitted to the candidate device.

According to the above descriptions, the disclosure provides a method for peer-to-peer multimedia data sharing, an electronic device and a non-volatile computer readable medium, by which the electronic device is capable of selecting the connected sink device according to a distance between the electronic device and the sink device, and directly establishing a connection with the sink device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
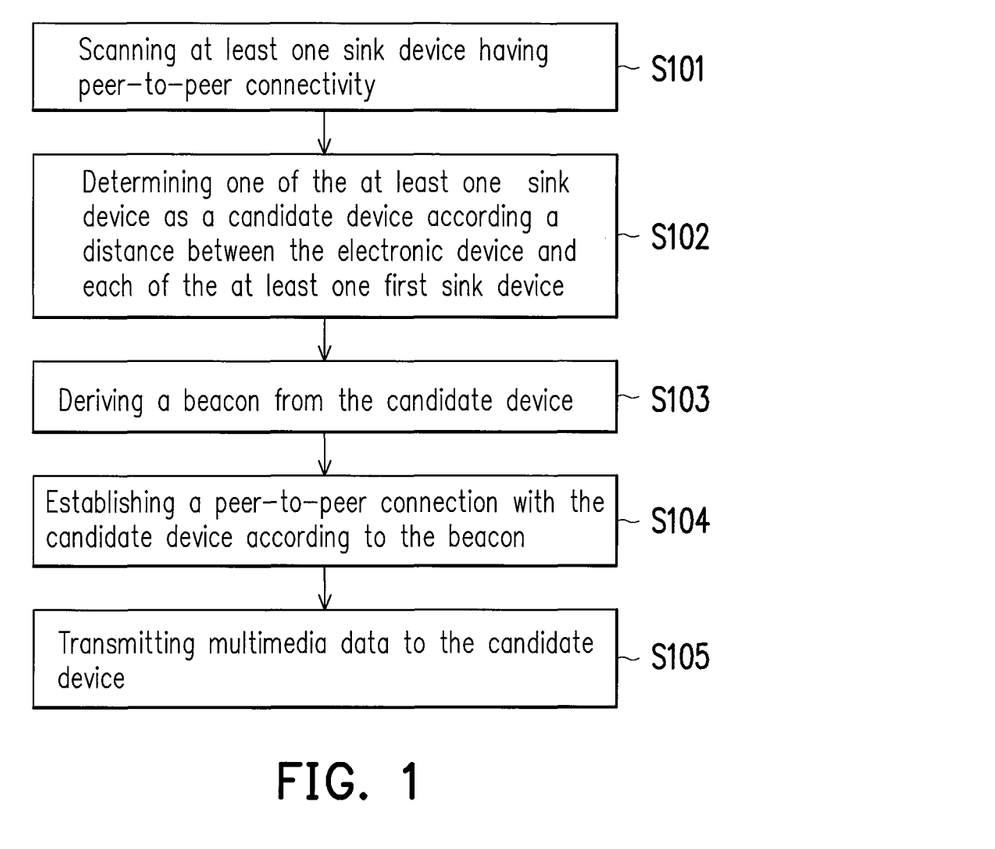
FIG. 1 is a flowchart illustrate a method for peer-to-peer multimedia data sharing according to an embodiment of the disclosure.

FIG. 1 is a flowchart illustrate a method for peer-to-peer multimedia data sharing according to an embodiment of the disclosure. The method for peer-to-peer multimedia data sharing is adapted to an electronic device having wireless connectivity. Referring to FIG. 1, first, in step S101, at least one first sink device having peer-to-peer connectivity is scanned. Then, in step S102, one of the at least one first sink device is determined to serve as a candidate device according a distance between the electronic device and the at least one first sink device. Then, in step S103, a beacon is derived from the candidate device. In step S104, a peer-to-peer connection is established with the candidate device according to the beacon. In step S105, multimedia data is transmitted to the candidate device.

Figure 2:
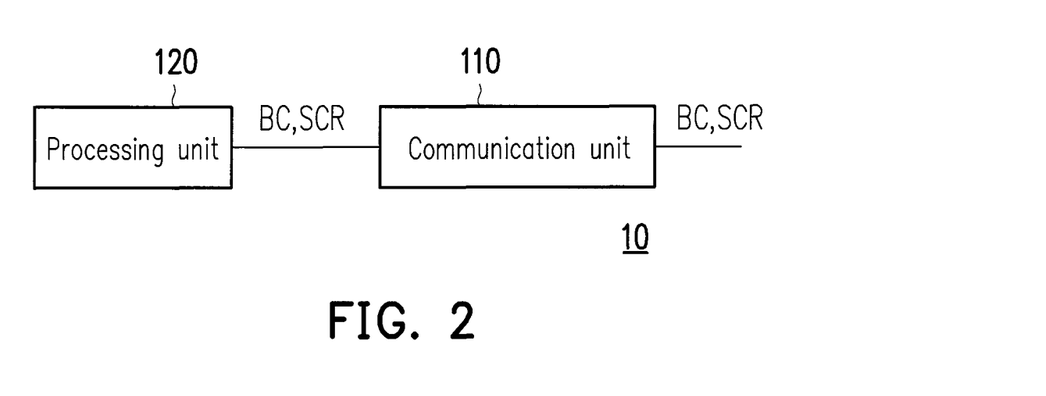
FIG. 2 is a block diagram of an electronic device according to an embodiment of the disclosure.

FIG. 2 is a block diagram of an electronic device according to an embodiment of the disclosure. Referring to FIG. 2, the electronic device 10 includes a communication unit 110 and a processing unit 120 coupled to the communication unit 110. The processing unit 120 scans at least one first sink device having peer-to-peer connectivity through the communication unit 110; determines one of the at least one first sink device to serve as a candidate device according a distance between the electronic device 10 and the at least one first sink device; derives a beacon BC from the candidate device through the communication unit 110, and analyzes the beacon BC to obtain connection information; determines whether a pin code is correct, and establishes a peer-to-peer connection with the candidate device through the communication unit 110 according to the connection information when the pin code is correct; and transmits multimedia data SCR to the candidate device through the communication unit 110.

In brief, when the electronic device 10 is connected to one or a plurality of sink devices, configurations that need to be executed by the user at least include activating a multimedia data/desktop sharing function, scanning to obtain a list of connectable sink devices, establishing the connection with one of the connectable sink devices in the list, and inputting a pin code displayed on a screen of the sink device for successfully pairing the sink device, and then the multimedia data SCR is transmitted.

In an embodiment of the disclosure, when the processing unit 120 obtains the beacon BC from the candidate device through the communication unit 110, the processing unit 120 further analyzes the beacon BC to obtain the connection information. When the processing unit 120 determines that the pin code is correct, the processing unit 120 establishes the peer-to-peer connection with the candidate device through the communication unit 110 according to the connection information, and transmits the multimedia data SCR to the candidate device.

In the present embodiment, the electronic device 10 can be regarded as a source device of multimedia data or a remote desktop, and can be any electronic device having the wireless connectivity, for example, a smart phone, a tablet personal computer (PC), a notebook computer, a music player having the wireless connectivity or a digital camera, etc. The sink device is also an electronic device having the wireless connectivity and is capable of establishing the peer-to-peer connection with the electronic device 10, and the sink device is, for example, a smart phone, a tablet PC, a notebook computer, a personal computer, a smart television having the wireless connectivity, a media box or a set-top box connected to television, etc. In a general application, the sink device generally has a larger display unit or a better multimedia playing quality compared with that of the electronic device 10, though in some applications, the sink device can also be the same or similar to the electronic device 10, which is not limited by the disclosure.

In an embodiment of the disclosure, the peer-to-peer connection between the electronic device 10 and the sink device is, for example, a connection based on WiFi, i.e. the communication unit 110 is a wireless communication unit having WiFi connectivity. However, the peer-to-peer connection between the electronic device 10 and the sink device is not limited thereto. The connection information obtained by analyzing the beacon can also be obtained through signal exchange between the electronic device 10 and the sink device when the electronic device 10 and the sink device are connected through communication protocol, which is not limited by the disclosure.

On the other hand, the multimedia data SCR mentioned in the present disclosure can be a static image, motion images or a video containing audio and motion images, etc., which is, for example, a projecting screen which is synchronized with the desktop of the user interface of the electronic device 10, an extending desktop screen corresponding to the user interface of the electronic device 10, or a multimedia file played by an application program executed by the processing unit 120. The aforementioned motion images (desktop screen, multimedia files) can be packaged into a video stream including a plurality of packets through compression and cutting for transmitting to the sink device.

Figure 3:
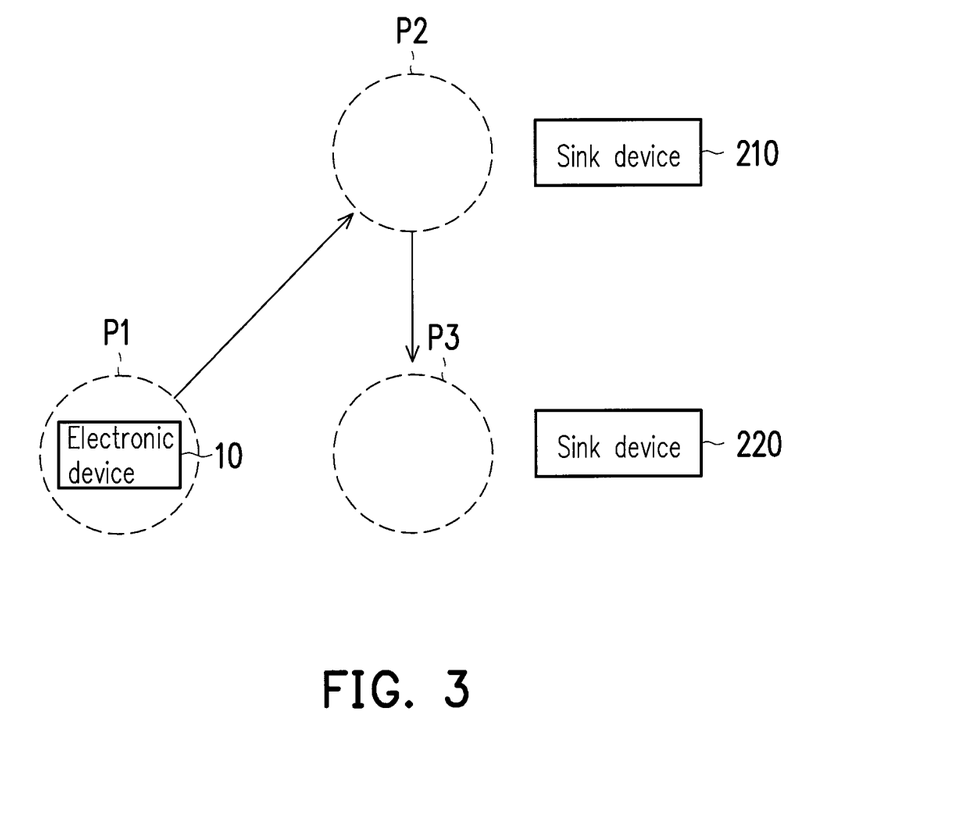
FIG. 3 is a schematic diagram illustrating a position relationship between an electronic device and sink devices according to an embodiment of the disclosure.

FIG. 3 is a schematic diagram illustrating a position relationship between the electronic device and the sink devices according to an embodiment of the disclosure. Referring to FIG. 3, when the electronic device is about to establish the peer-to-peer connection with one of the sink devices 210 and 220 through the conventional method to share the multimedia data, regardless of positions P1-P3, the user first needs to use the electronic device 10 to activate the multimedia data sharing function, and then obtains a list including the sink devices 210 and 220, and clicks a function button corresponding to one of the sink devices 210 and 220. For example, when the user wants to establish the connection with the sink device 220, the user inputs a pin code displayed on the sink device 220 to an input device of the electronic device 10, and after it is determined that the pin code is correct. The multimedia data could be shared.

When the electronic device or the method for peer-to-peer multimedia data sharing of the disclosure is used under the above situation, the processing unit 120 of the electronic device 10 determines whether there are sink devices having the peer-to-peer connectivity exist nearby through a scan function, and directly determines the sink device having the closest distance with the electronic device 10 as the candidate device to be connected, and directly establishes the peer-to-peer connection with the candidate device for sharing the multimedia data SCR.

For example, when the user and the electronic device 10 are located at the position P1 or P3, the electronic device 10 determines the sink device 220 with the closest distance as the candidate device, and directly establishes the peer-to-peer connection with the sink device 220. When the user and the electronic device 10 are located at the position P2, the electronic device 10 determines the sink device 210 with the closest distance as the candidate device. Determination of the closest distance can be performed according to user's requirement as: (1) the closest sink device is periodically determined as the candidate device, or (2) after the candidate device is selected after a first determination, the candidate device is re-selected only when the user performs a connection cut-off operation. For example, the user and the electronic device 10 are moved from the position P1 to the position P2 and are then moved to the position P3 as shown by arrows of FIG. 3, in an embodiment (1), the processing unit 120 of the electronic device 10 selects the sink device 220 as the candidate device when the user and the electronic device 10 are located at the position P1, and selects the sink device 210 as the candidate device as the user and the electronic device 10 approach to the position P2, and again selects the sink device 220 as the candidate device when the user and the electronic device 10 are moved to the position P3 from the position P2. For example, if the sink devices 210 and 220 are sink devices disposed nearby artworks in an art gallery or a museum, the sink device closest to an artwork commentator (the user now) is automatically switched to display briefings for narration.

In an embodiment of the disclosure, the processing unit 120 of the electronic device 10 can also select more than one sink device as the candidate devices, and when the candidate devices are successfully connected, the candidate devices can simultaneously receive and display/play the multimedia data from the electronic device 10. According to another aspect, the sink devices 210 and 220 can simultaneously establish the peer-to-peer connection with a plurality of electronic devices, and simultaneously display the multimedia data received from various electronic devices in a screen splitting mode, though the disclosure is not limited thereto.

In an embodiment (2), the processing unit 120 of the electronic device 10 selects the sink device 220 as the candidate device when the electronic device 10 is located as the position P1, and is not changed to select the sink device 210 as the candidate device when the electronic device 10 is moved to the position P2. In such embodiment, when the user is located at the position P2, though the electronic device 10 has set the sink device 220 as the candidate device and has established the peer-to-peer connection with the sink device 220, the user has to input an operation signal or an operation instruction corresponding to interruption of the current connection, such that the processing unit 120 of the electronic device 10 interrupts the current peer-to-peer connection and re-determines the candidate device to be connected according to the current distances between the electronic device 10 and the sink devices. For example, the user is a teacher teaching in a classroom, and in the classroom, besides a projector or an electronic whiteboard located in the front of the classroom, other sink devices are also used in the classroom, and according to the above configuration, the teacher can carry the electronic device 10 to move around in the classroom without connecting the other sink devices by mistake.

In an embodiment of the disclosure, the processing unit 120 can determine the distance between the electronic device 10 and the sink device according to a signal strength between the electronic device 10 and the sink device. For example, when the electronic device 10 scans whether the sink devices having the peer-to-peer connectivity exist nearby through the communication unit 110, the electronic device 10 receives a beacon of each of the sink devices, and analyzes the beacon of each of the sink devices to obtain a received signal strength indicator (RSSI), and the processing unit 120 deduces the signal strength between the electronic device 10 and each of the sink devices according to the RSSI of the corresponding sink device, and accordingly determines the distance between the electronic device 10 and the sink device. Generally, the higher the signal strength is, the closer the distance between the electronic device 10 and the sink device is, though an error probably exists due to configuration of the sink device itself. For example, although the electronic device 10 is located at the position P2, the signal strength of the sink device 220 calculated by the processing unit 120 is higher than that of the sink device 210, and in this case, the electronic device 10 probably takes the sink device with a longer distance as the candidate device by mistake. In this case, the user can still input an operation signal or an operation instruction corresponding to interruption of the current connection to interrupt the undesired connection.

Figure 4A:
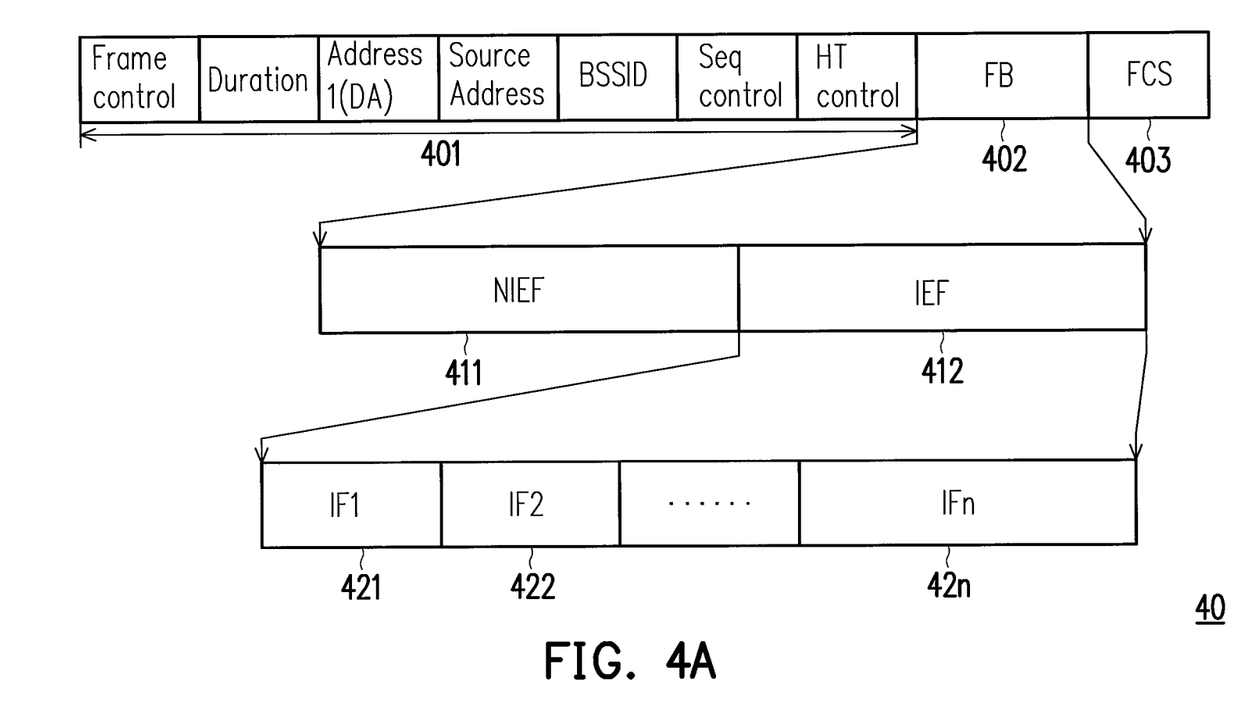
FIG. 4A is a diagram illustrating a data structure of a beacon according to an embodiment of the disclosure.

FIG. 4A is a diagram illustrating a data structure of a beacon according to an embodiment of the disclosure. Referring to FIG. 4A, the beacon 40 generally includes a header 401 of a media access control (MAC) layer, a frame body (FB) 402 and a frame check sequence (FCS) 403. The header 401 of the MAC layer includes plenty of information required for data transmission, for example, a frame control code, a transmission duration code, a destination address/address 1, a source address, a basic service set ID (BSSID), a sequence control code, an HT control code, etc. The FB 402 may include a non-information element field (NIEF) 411 and an information element field (IEF) 412.

The IEF 412 includes n information elements 421-42n, where n can be between 0 and 40. The information elements 421-42n include a plurality of information necessary or selectively required for the connection, for example, the aforementioned RSSI.

Figure 4B:
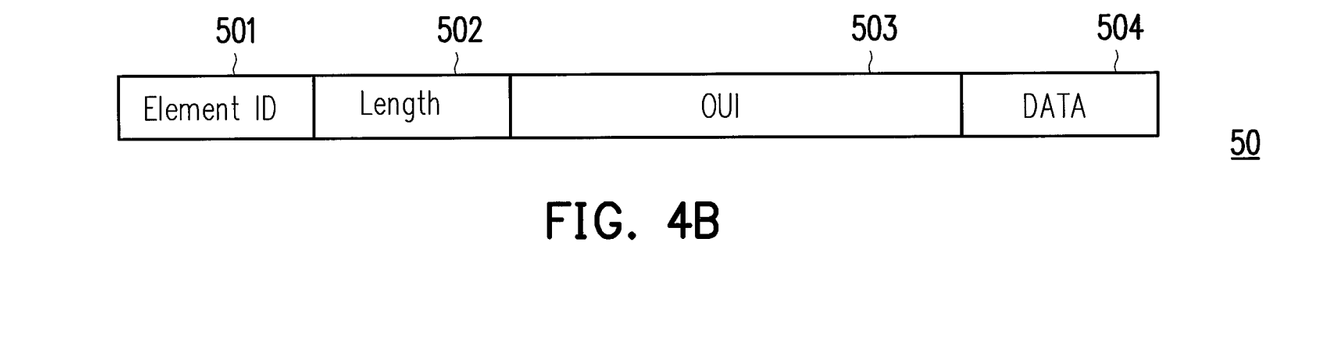
FIG. 4B is diagram illustrating a data structure of an information element in a beacon.

FIG. 4B is diagram illustrating a data structure of an information element in the beacon. Referring to FIG. 4B, the information element 50 (any one of the information elements 421-42n) includes an element ID 501, an element length 502, an organizationally unique identifier (OUI) 503 and data 504. The processing unit 120 can identify the data 504 included in the information element (for example, the information element 421) through the element ID 501. Therefore, when the processing unit 120 obtains the beacon of each of the sink devices through the communication unit 110, the processing unit 120 can analyze the information elements 421-42n in the beacon to obtain the RSSI of each of the sink devices, so as to determine the distance between the electronic device 10 and each of the sink devices.

On the other hand, in an embodiment of the disclosure, a part of the sink devices pre-writes the pin code used for the peer-to-peer connection into one of the information elements 421-42n, and the aforementioned element ID 501 is used for identification. Therefore, when the processing unit 120 receives the beacon through the communication unit 110, the processing unit 120 analyzes the beacon to obtain the pin code, and further determines whether the pin code is correct. In this way, the user is unnecessary to observe the pin code displayed on a display unit of the sink device to perform the corresponding input, by which a burden of the user is relieved.

Figure 5A:
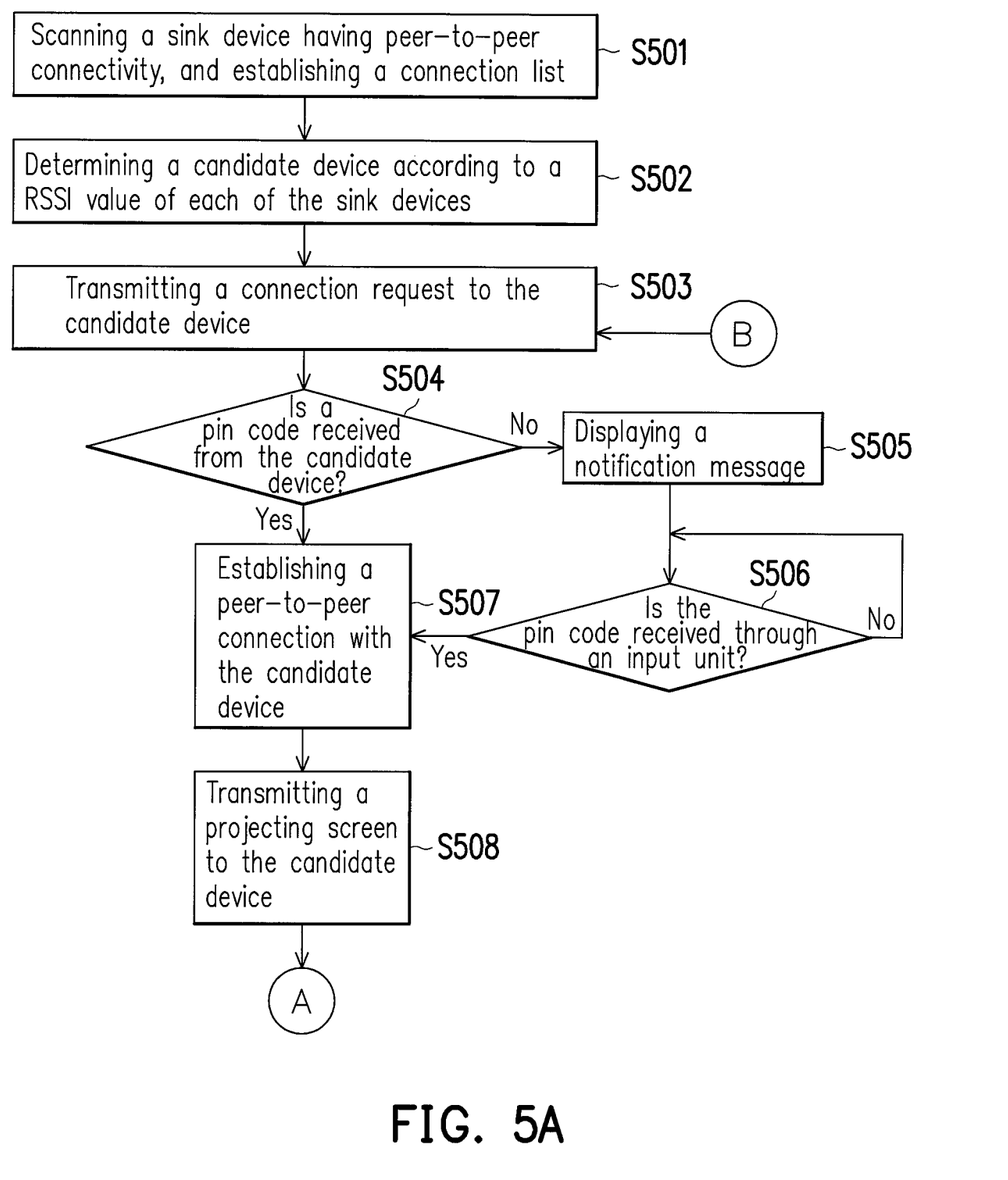
FIG. 5A and FIG. 5B are flowcharts illustrating a method for peer-to-peer multimedia data sharing according to an embodiment of the disclosure.
Figure 5B:
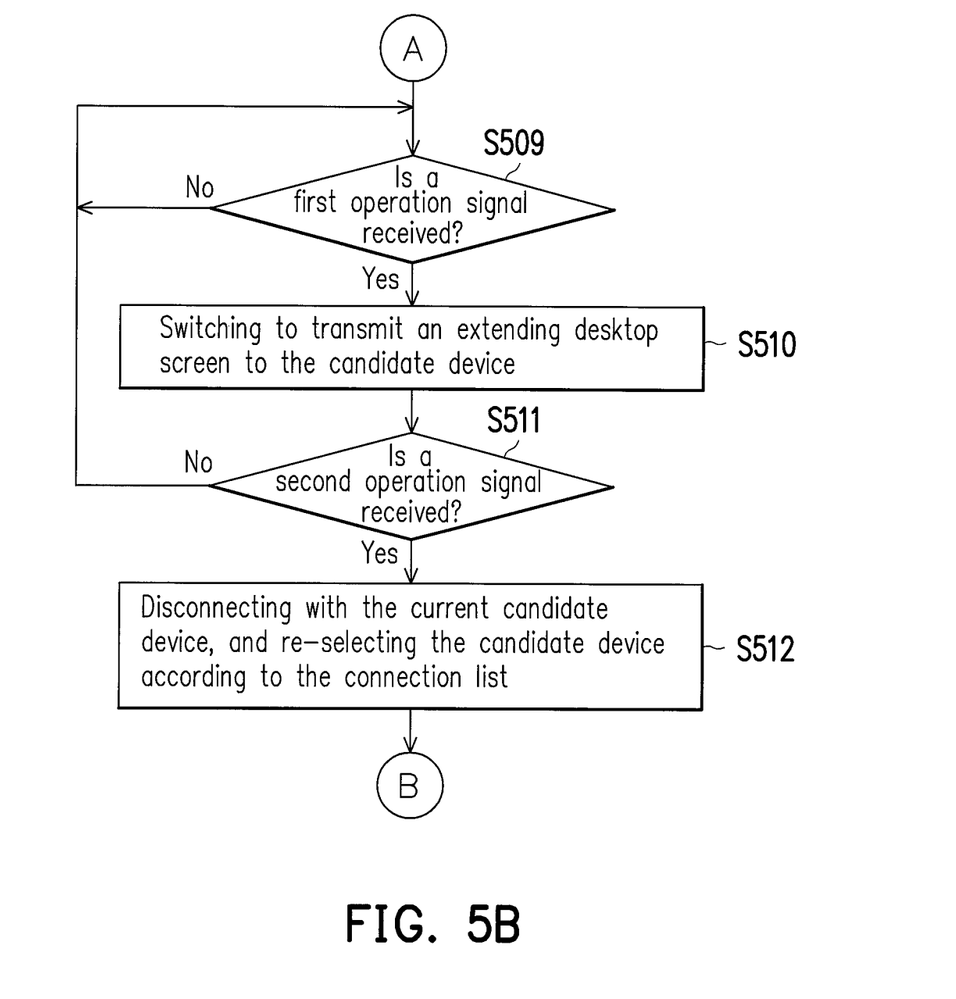

FIG. 5A and FIG. 5B are flowcharts illustrating a method for peer-to-peer multimedia data sharing according to an embodiment of the disclosure. Compared to the embodiment of FIG. 1, the embodiment of FIG. 5A and FIG. 5B is executed under a usage situation, and a detailed implementation is provided. In such usage situation, the multimedia data includes a projecting screen and an extending desktop screen of the user interface of an operating system executed by the electronic device 10.

When the multimedia data is the projecting screen of the user interface, the multimedia data transmitted to the sink device is the same and synchronous with the multimedia data displayed on a display unit (not shown) of the electronic device 10. When the multimedia data is the extending desktop screen of the user interface, the multimedia data transmitted to the sink device and the multimedia data displayed on the display unit (not shown) of the electronic device 10 respectively belong to different portions of the user interface, for example, a first desktop and a second desktop respectively. When the multimedia data is the extending desktop screen, the multimedia data transmitted to the sink device can also be a video stream, and the content of the video stream is played in a full-screen mode on the second desktop. The relationship between the multimedia data and the user interface and the video stream is different in configuration along with an actual application, and the disclosure is not limited thereto. In the present embodiment, the electronic device 10 is predetermined to transmit projecting screen to the sink device.

Referring to FIG. 2 and FIG. 5A, first, the user can execute a step S501 by activating a wireless sharing function of the electronic device 10, or even the processing unit 120 starts to execute the step S501 when the user activates a wireless connection function of the electronic device 10. Similarly, the user can disable execution of steps S501-S512 by turning off the wireless sharing function or the wireless connection function of the electronic device 10. It is assumed that the communication unit 110 is a WiFi wireless module, and in the present embodiment, the steps S501-S512 are implemented through an ad hoc mode, which can be synchronously operated together with an infrastructure mode used for connecting the Internet in a time division multiplexing manner.

First, the processing unit 120 scans whether a sink device (i.e. a first sink device) having the peer-to-peer connectivity exists nearby through the communication unit 110, and establishes a connection list to store connection information and a RSSI (which is, for example, obtained through a beacon sent by the sink device) of the scanned sink device having the peer-to-peer connectivity (step S501). It should be noticed that the processing unit 120 periodically updates the connection list. For example, the processing unit 120 periodically determines whether the sink devices in the connection list still have the connectivity (for example, whether the sink device is turned off or in a sleep mode, etc.) in a polling mechanism, or periodically scans whether a beacon sent by a sink device (i.e. a second sink device) outside the connection list exists nearby through an addition manner.

Moreover, in an embodiment of the disclosure, the processing unit 120 further determines a displacement of the electronic device 10 by using a motion sensor (not shown) coupled to the processing unit 120 in the electronic device 10. When the processing unit 120 determines that the displacement of the electronic device 10 is greater than a threshold (for example, 20 m), the processing unit 120 re-scans the nearby sink devices and updates the aforementioned connection list. The operation of updating the connection list could be executed in a background mode, i.e. regardless of whether the peer-to-peer connection is established, the processing unit 120 continuously updates the connection list.

Then, the processing unit 120 determines one of the sink devices as a candidate device according to the RSSI of each of the sink devices recorded in the connection list (for example, to obtain the sink device having the highest signal strength according to the RSSI) (step S502). After determining one of the sink devices as the candidate device, the processing unit 120 transmits a peer-to-peer connection request to the candidate device through the communication unit 110 (step S503). Before the connection is established, the processing unit 120 completes preparations required for establishing the connection such as determining a master-slave relationship between the processing unit 120 and the candidate device or determining a group owner, etc. through a signal exchange between the communication unit 110 and the candidate device. Then, the processing unit 120 analyzes the beacon come from the candidate device to determine whether a pin code is received from the candidate device (step S504). If not, the processing unit 120 controls a display unit (not shown) of the electronic device 10 to display a notification message (step S506), so as to notify the user to input the pin code through an input unit (not shown) of the electronic device 10 according to a display of the sink device (step S506).

When the processing unit 120 determines that the pin code is obtained by analyzing the beacon (step S504, yes) or the pin code input by the user is obtained through the input unit (step S506, yes), the processing unit 120 determines whether the pin code is correct through a table look-up manner or calculation of a specific algorithm. If the pin code is correct, the processing unit 120 establishes the peer-to-peer connection with the candidate device through the communication unit 110 (step S507), and transmits a projecting screen to the candidate device after the connection is established, so as to play the projecting screen through the display unit of the candidate device (step S508).

It should be noticed that the peer-to-peer connection further includes a user interface back channel (UIBC), such that the processing unit 120 of the electronic device 10 can receive one or a plurality of control signals come from the sink device through the UIBC and the communication unit 110. In this way, other users can control the electronic device 10 and display of the multimedia data through an interaction between the user and the multimedia data displayed on the sink device (for example, operating an input/output unit of the sink device).

Referring to FIG. 2 and FIG. 5B, after transmitting the projecting screen to the candidate device (the step S508 to A), the processing unit 120 continuously determines whether a trigger signal (for example, an operation signal generated by the electronic device 10 in order to make the sink device to display the extending desktop screen) corresponding to an extending desktop screen is received through the input unit of the electronic device 10 (step S509) and whether a trigger signal (for example, an operation signal generated by the electronic device 10 in order to interrupt the current connection) corresponding to interruption of the current connection is received (step S511). When the processing unit 120 received the trigger signal used for switching the multimedia data to the extending desktop screen from the input unit of the electronic device 10 (the step S509, yes), the processing unit 120 is switched to transmit the extending desktop screen of the operating system to the candidate device.

In an embodiment of the disclosure, when the extending desktop screen includes an application program used for playing the multimedia data (video, music, etc.), a control panel of the application program set based on the user interface is also appeared on the sink device. The processing unit 120 further sets the control panel corresponding to the application program on the user interface displayed on the electronic device 10, for example, the control panel is set and settled to a pull-down notification bar in the user interface, such that the user of the electronic device 10 can easily control the played multimedia data.

When the processing unit 120 receives the trigger signal corresponding to interruption of the current connection from the input unit of the electronic device 10 (the step S511, yes), since such operation of the user generally indicates that the currently connected candidate device is not the sink device desired to be connected by the user, the processing unit 120 controls the communication unit 110 to disconnect with the existing candidate device, and deletes the existing candidate device from the connection list, and re-selects the candidate device according to the connection list (step S512). After determining that the candidate device is obtained, the processing unit 120 connects the new candidate device and executes the aforementioned steps S503 to S512 and determinations (step S512 to B).

Moreover, the disclosure further provides a non-volatile computer readable media, which is used for storing a plurality of program codes, where the program codes are adapted to be loaded to a processing unit to execute following steps. At least one first sink device having peer-to-peer connectivity is scanned. One of the at least one first sink device is determined to serve as a candidate device according a distance between the electronic device and each of the at least one first sink device. A beacon is derived from the candidate device, and connection information is obtained from the beacon. It is determined whether a pin code is correct, and when the pin code is correct, a peer-to-peer connection is established with the candidate device according to the connection information. Multimedia data is transmitted to the candidate device. Detailed implementation of the non-volatile computer readable medium may refer to the aforementioned embodiment, and details thereof are not repeated.

In summary, the disclosure provides a method for peer-to-peer multimedia data sharing, an electronic device and a non-volatile computer readable medium, and the electronic device can directly establish a peer-to-peer connection with the sink device with the closest distance or the strongest signal strength according to the distance between the electronic device and the sink device, such that the user is avoided to perform complicated setting steps. When the sink device has a function of writing the pin code into the beacon, correctness of the pin code can be directly and automatically determined before the connection even without inputting the pin code. In this way, the user can share the desktop of the user interface or play multimedia files on the sink device in a simple manner.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for peer-to-peer multimedia data sharing, adapted to an electronic device, and comprising:
   scanning at least one first sink device having peer-to-peer connectivity;
   receiving a beacon of each of the at least one first sink device;
   analyzing the beacon of each of the at least one first sink device to obtaining a signal strength between the electronic device and the at least one first sink device;
   determining one of the at least one first sink device to serve as a candidate device according a distance between the electronic device and each of the at least one first sink device, determining the distance between the electronic device and each of the at least one first sink device according to the signal strength between the electronic device and the at least one first sink device;
   deriving the beacon from the candidate device;
   determining whether a pin code is received from the beacon of the candidate device, wherein the candidate device is one of the at least one first sink device nearest to the electronic device among the at least one first sink device;
   analyzing the beacon to obtain the pin code, and determining whether the pin code is correct through a table look-up manner or calculation of a specific algorithm, and establishing a peer-to-peer connection with the candidate device according to the beacon in response to the pin code being correct if the pin code is received from the beacon of the candidate device;
   displaying a notification message, and receiving the pin code corresponding to the notification message if the pin code is not received from the beacon of the candidate device;
   executing an operating system having a user interface;
   transmitting multimedia data which comprises a projecting screen corresponding to the user interface to the candidate device; and
   switching from transmitting the projection screen corresponding to the user interface to the candidate device to transmitting the extending desktop screen of the user interface to the candidate device when a trigger signal corresponding to the extending desktop screen is received.

2. The method for peer-to-peer multimedia data sharing as claimed in claim 1, wherein
   after the step of deriving the beacon from the candidate device, the method further comprises:
   obtaining connection information by analyzing the beacon; and
   the step of establishing the peer-to-peer connection with the candidate device according to the beacon comprises:
   establishing the peer-to-peer connection with the candidate device according to the connection information in the beacon.

3. The method for peer-to-peer multimedia data sharing as claimed in claim 1, wherein after the step of scanning the at least one first sink device having peer-to- peer connectivity, the method further comprises:
   storing the distance of each of the at least one first sink device having peer-to- peer connectivity and the connection information into a connection list; and
   periodically updating the connection list through a polling mechanism.

4. The method for peer-to-peer multimedia data sharing as claimed in claim 3, wherein after the step of transmitting the multimedia data to the candidate device, the method further comprises:
   re-selecting one of the at least one first sink device as the candidate device according to the connection list when a trigger signal corresponding to interruption of the peer-to-peer connection is received.

5. The method for peer-to-peer multimedia data sharing as claimed in claim 3, wherein after the step of periodically updating the connection list through the polling mechanism, the method further comprises:
   re-scanning at least one second sink device having the peer-to-peer connectivity to update the connection list when a displacement of the electronic device is greater than a threshold.

6. The method for peer-to-peer multimedia data sharing as claimed in claim 1, wherein after the step of transmitting the multimedia data to the candidate device, the method further comprises:
   receiving at least one control signal corresponding to the multimedia data from a user interface back channel in the peer-to-peer connection.

7. An electronic device, comprising:
   a communication processor; and a processor, coupled to the communication processor, wherein the processor scans at least one first sink device having peer-to-peer connectivity through the communication processor;

the communication processor receives a beacon of each of the at least one first sink device;

the processor analyzes the beacon of each of the at least one first sink device to obtaining a signal strength between the electronic device and the at least one first sink device;

the processor determines one of the at least one first sink device to serve as a candidate device according a distance between the electronic device and each of the at least one first sink device, and determines the distance between the electronic device and each of the at least one first sink device according to the signal strength between the electronic device and the at least one first sink device;

the processor derives the beacon from the candidate device through the communication processor;

the processor determines whether a pin code is received from the beacon of the candidate device, wherein the candidate device is one of the at least one first sink device nearest to the electronic device among the at least one first sink device;

the processor analyzes the beacon to obtain the pin code, determines whether the pin code is correct through a table look-up manner or calculation of a specific algorithm, and establishes a peer-to-peer connection with the candidate device according to the beacon in response to the pin code being correct if the pin code is received from the beacon of the candidate device;

the processor displays a notification message, and receives the pin code corresponding to the notification message if the pin code is not received from the beacon of the candidate device;

the processor executes an operating system having a user interface, and the multimedia data comprises a projecting screen corresponding to the user interface;

the processor transmits the projecting screen of the user interface to the candidate device through the communication processor; and when the processor receives a trigger signal corresponding to the extending desktop screen through an input unit of the electronic device, the processor switches from transmitting the projecting screen of the user interface to the candidate device to transmitting an extending desktop screen of the user interface to the candidate device.

8. The electronic device as claimed in claim 7, wherein the processor analyzes the beacon to obtain connection information; and the processor establishes the peer-to-peer connection with the candidate device according to the connection information in the beacon.

9. The electronic device as claimed in claim 7, further comprising:

a display unit, coupled to the processor, wherein the processor displays the notification message through the display unit.

10. The electronic device as claimed in claim 7, wherein the processor stores the distance of the at least one first sink device having peer- to-peer connectivity and the connection information into a connection list, and the processor periodically updates the connection list according to a polling mechanism through the communication processor.

11. The electronic device as claimed in claim 10, wherein when the processor receives a trigger signal corresponding to interruption of the peer-to-peer connection through an input unit of the electronic device, the processor re- selects one of the at least one first sink device as the candidate device according to the connection list.

12. The electronic device as claimed in claim 10, further comprising:

a motion sensor, coupled to the processor;

wherein when the processor senses that a displacement of the electronic device is greater than a threshold through the motion sensor, the processor re-scans at least one second sink device having the peer-to-peer connectivity to update the connection list.

13. The electronic device as claimed in claim 7, wherein the processor receives at least one control signal corresponding to the multimedia data from a user interface back channel in the peer-to-peer connection through the communication processor.

14. A non-volatile computer readable medium, adapted to store a plurality of program codes, wherein the program codes are adapted to be loaded to a processor to execute:

scanning at least one first sink device having peer-to-peer connectivity;

receiving a beacon of each of the at least one first sink device;

analyzing the beacon of each of the at least one first sink device to obtaining a signal strength between the electronic device and the at least one first sink device;

determining one of the at least one first sink device to serve as a candidate device according a distance between the electronic device and each of the at least one first sink device, determining the distance between the electronic device and each of the at least one first sink device according to the signal strength between the electronic device and the at least one first sink device;

deriving the beacon from the candidate device;

determining whether a pin code is received from the beacon of the candidate device, wherein the candidate device is one of the at least one first sink device nearest to the electronic device among the at least one first sink device;

analyzing the beacon to obtain the pin code, determining whether the pin code is correct through a table look-up manner or calculation of a specific algorithm,_and establishing a peer-to-peer connection with the candidate device according to connection information in response to the pin code being correct if the pin code is received from the beacon of the candidate device;

displaying a notification message, and receiving the pin code corresponding to the notification message if the pin code is not received from the beacon of the candidate device;

executing an operating system having a user interface;

transmitting multimedia data which comprises a projecting screen corresponding to the user interface to the candidate device; and switching from transmitting the projection screen corresponding to the user interface to the candidate device to transmitting the extending desktop screen of the user interface to the candidate device when a trigger signal corresponding to the extending desktop screen is received.

* * * * *